US012140895B2

(12) United States Patent
Mandai

(10) Patent No.: US 12,140,895 B2
(45) Date of Patent: Nov. 12, 2024

(54) IMAGE FORMING APPARATUS, FOG MARGIN DETERMINATION METHOD AND NON- TRANSITORY COMPUTER-READABLE RECORDING MEDIUM ENCODED WITH FOG MARGIN DETERMINATION PROGRAM

(71) Applicant: Konica Minolta, Inc., Tokyo (JP)

(72) Inventor: Yuusuke Mandai, Kyoto (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/464,798

(22) Filed: Sep. 11, 2023

(65) Prior Publication Data

US 2024/0103418 A1 Mar. 28, 2024

(30) Foreign Application Priority Data

Sep. 22, 2022 (JP) ................................ 2022-151627

(51) Int. Cl.
*G03G 15/06* (2006.01)
*G03G 15/00* (2006.01)

(52) U.S. Cl.
CPC ....... *G03G 15/5025* (2013.01); *G03G 15/065* (2013.01)

(58) Field of Classification Search
CPC ......................... G03G 15/065; G03G 15/5025
USPC ..................................................... 399/50, 55
See application file for complete search history.

(56) References Cited

FOREIGN PATENT DOCUMENTS

| | | | |
|---|---|---|---|
| JP | 2004126245 | * | 4/2004 |
| JP | 2004287388 | * | 10/2004 |
| JP | 2009-271240 | A | 11/2009 |
| JP | 2014-228630 | A | 12/2014 |
| JP | 2015-096904 | A | 5/2015 |

* cited by examiner

*Primary Examiner* — Hoan H Tran
(74) *Attorney, Agent, or Firm* — LUCAS & MERCANTI, LLP

(57) ABSTRACT

An image forming apparatus includes a density detector that detects a density of a fog image formed on an image bearing member, a temporary determiner that determines a temporary fog margin which is a fog margin representing a difference between a developing bias to be applied to a toner bearing member and a charging bias to be applied to a charging device for charging the image bearing member based on a density detected by the density detector, and a corrector that corrects the temporary fog margin based on a change rate of a density detected by the density detector with respect to a change of a fog margin.

18 Claims, 9 Drawing Sheets

IMAGE FORMING APPARATUS, FOG MARGIN DETERMINATION METHOD AND NON- TRANSITORY COMPUTER-READABLE RECORDING MEDIUM ENCODED WITH FOG MARGIN DETERMINATION PROGRAM

CROSS-REFERENCE TO RELATED APPLICATIONS

The entire disclosure of Japanese patent Application No. 2022-151627 filed on Sep. 22, 2022 is incorporated herein by reference in its entirety.

BACKGROUND

Technological Field

The present invention relates to an image forming apparatus, a fog margin determination method and a fog margin determination program. In particular, the present invention relates to an image forming apparatus that forms a toner image on an image bearing member, and a fog margin determination method performed in the image forming apparatus and a non-transitory computer-readable recording medium encoded with a fog margin determination program.

Description of the Related Art

An image forming apparatus represented by an MFP (Multi Function Peripheral) includes a photosensitive drum and a developing roller. The developing roller bears a developer that includes toner. The toner borne by the developing roller is transferred onto an electrostatic latent image formed on the photosensitive drum, so that a toner image is formed on the photosensitive drum. After the toner image borne by the photosensitive drum is transferred onto a recording medium or the like, a residual toner that remains on the photosensitive drum without being transferred is removed by a blade member. At this time, toner particles serve as a lubricant, and a frictional force between an edge of the blade and the photosensitive drum is reduced.

It is preferable that toner is not essentially transferred to the recording medium in regard to a portion corresponding to the background of an image. On the other hand, in order to reduce the frictional force between the edge of the blade and the photosensitive drum, it is necessary that a predetermined amount of toner is borne by the photosensitive drum in a portion corresponding to the background of an image. An amount of toner borne by the photosensitive drum in a portion corresponding to the background of an image is referred to as a fog amount. When this fog amount is increased, the consumption amount of toner is increased. Conversely, when the fog amount is decreased, the cleaning performance of the photosensitive drum is degraded.

According to Patent Literature 1, a fog toner density on a photoreceptor is measured with use of an optical sensor for measuring the density of a control toner image formed on the photoreceptor. In a case in which the fog toner density exceeds a predetermined value, a transfer bias is increased by a predetermined width in an allowable range of degradation in transfer efficiency. Thus, the transfer efficiency of a fog toner is degraded, and the background contamination that stands out and caused by adherence of toner to the white background of an image is suppressed.

However, when toner is supplied to the surface of the photoreceptor as a fog image, the consumption amount of toner increases accordingly. Therefore, it is desirable to supply toner as little as possible while suppressing friction. In this manner, an amount of fog toner to be supplied to the surface of the photoreceptor is inevitably very small, and it is difficult to detect the fog toner on the surface of the photoreceptor with use of the optical sensor as described in Patent Literature 1 due to its detection ability.

Meanwhile, it has been known that a fog amount is affected by a fog margin which is the voltage difference between a developing bias to be applied to a developing roller and a charging bias for charging the photosensitive drum. Conventionally, this fog margin is defined in advance by experiment. However, because an appropriate value of a fog margin changes according to the state of the image forming apparatus, it is difficult to determine an appropriate fog margin in accordance with a change in state of the image forming apparatus.

SUMMARY

According to one aspect of the present invention, an image forming apparatus includes a density detector that detects a density of a fog image formed on an image bearing member, a temporary determiner that determines a temporary fog margin which is a fog margin representing a difference between a developing bias to be applied to a toner bearing member and a charging bias to be applied to a charging device for charging the image bearing member based on a density detected by the density detector, and a corrector that corrects the temporary fog margin based on a change rate of a density detected by the density detector with respect to a change of a fog margin.

According to another aspect of the present invention, a fog margin determination method causes an image forming apparatus to execute a density detecting step of detecting a density of a fog image formed on an image bearing member, a temporary determining step of determining a temporary fog margin which is a fog margin representing a difference between a developing bias to be applied to a toner bearing member and a charging bias to be applied to a charging device for charging the image bearing member based on a density detected in the density detecting step, and a correcting step of correcting the temporary fog margin based on a change rate of a density detected in the density detecting step with respect to a change of a fog margin.

According to yet another aspect of the present invention, a non-transitory computer-readable recording medium encoded with a fog margin determination program executed in a computer, the fog margin determination program causing the computer to perform a density detecting step of detecting a density of a fog image formed on an image bearing member, a temporary determining step of determining a temporary fog margin which is a fog margin representing a difference between a developing bias to be applied to a toner bearing member and a charging bias to be applied to a charging device for charging the image bearing member based on a density detected in the density detecting step, and a correcting step of correcting the temporary fog margin based on a change rate of a density detected in the density detecting step with respect to a change of a fog margin.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
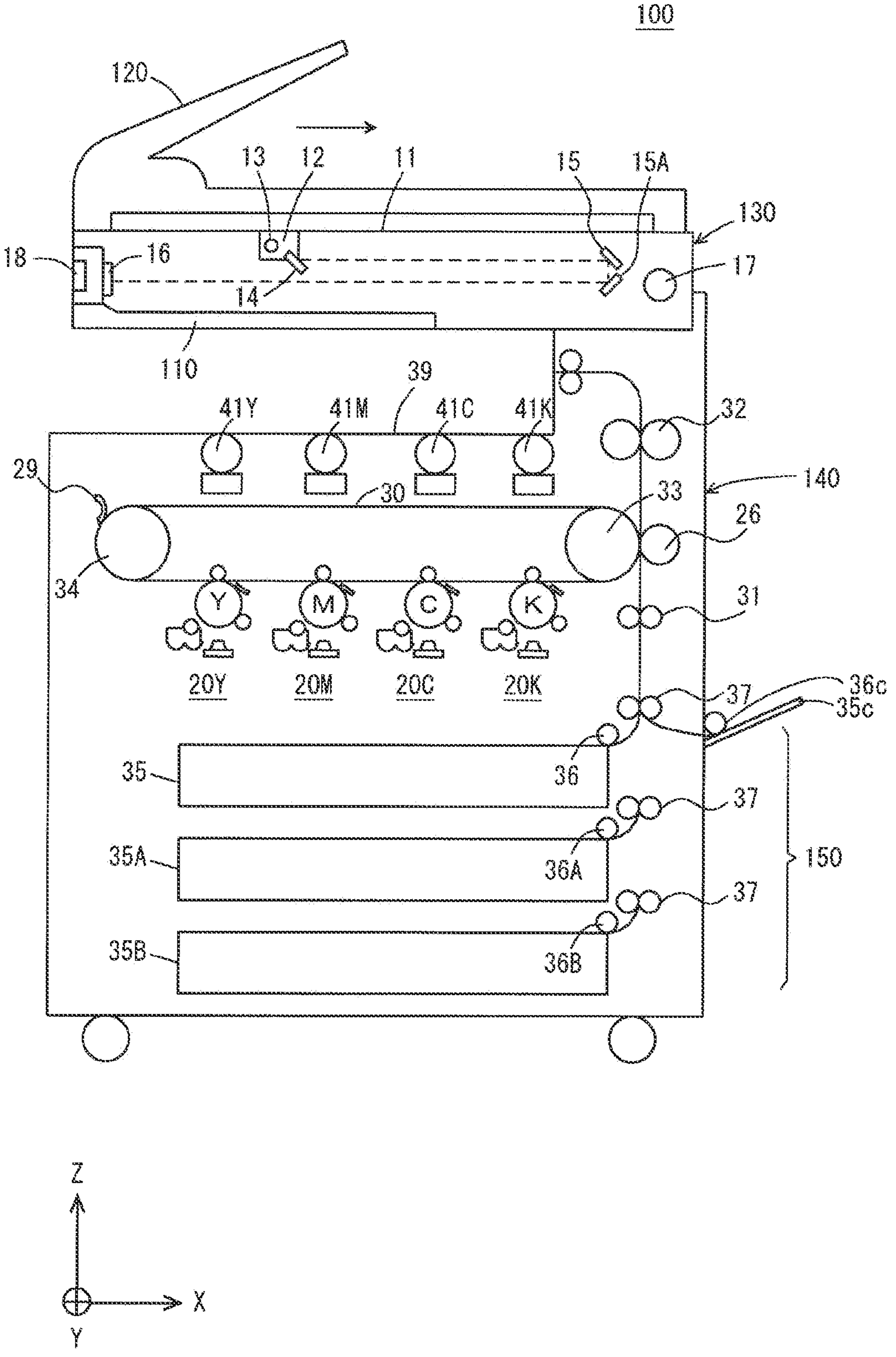
FIG. 1 is a schematic cross-sectional view showing the inner configuration of an MFP in one embodiment of the present invention.

Hereinafter, one or more embodiments of the present invention will be described with reference to the drawings. However, the scope of the invention is not limited to the disclosed embodiments.

Embodiments of the present invention will be described below with reference to the drawings. In the following description, the same components are denoted by the same reference numerals. Their names and functions are also the same. Therefore, a detailed description thereof will not be repeated.

FIG. 1 is a schematic cross-sectional view showing the inner configuration of an MFP in one embodiment of the present invention. In FIG. 1 and subsequent predetermined diagrams, described below, the arrows indicating an X direction, a Y direction and a Z direction orthogonal to one another are shown to clarify the positional relationship. The X direction and the Y direction are orthogonal to each other in a horizontal plane, and the Z direction corresponds to a vertical direction. With reference to FIG. 1, an MFP (Multi Function Peripheral) 100 is an example of an image forming apparatus, and includes a document reading section 130 for reading a document, an automatic document conveyance apparatus 120 for conveying a document to the document reading section 130, an image forming section 140 for forming an image on a sheet based on image data and a sheet feed section 150 for feeding a sheet to the image forming section 140.

The document reading section 130 exposes an image of a document which is set on a document glass 11 by the automatic document conveyance apparatus 120, with an exposure lamp 13 which is attached to a slider 12 which moves below the document glass 11. The light reflected from the document is guided to a lens 16 by a mirror 14 and two reflecting mirrors 15, 15A, and forms an image on a CCD (Charge Coupled Devices) sensor 18.

The reflected light that has formed an image on the CCD sensor 18 is converted into image data as an electric signal in the CCD sensor 18. The image data is converted into printing data of cyan (C), magenta (M), yellow (Y) and black (K), and output to the image forming section 140.

The image forming section 140 has developing units 20Y, 20M, 20C, 20K respectively corresponding to yellow, magenta, cyan and black, and toner bottles 41Y, 41M, 41C, 41K respectively corresponding to yellow, magenta, cyan and black. Here, "Y," "M," C" and "K" represent yellow, magenta, cyan and black, respectively.

The only difference among the developing units 20Y, 20M, 20C, 20K is the color of toner used by the developing units 20Y, 20M, 20C, 20K. Further, the only difference among the toner bottles 41Y, 41M, 41C, 41K is the color of toner used by the toner bottles 41Y, 41M, 41C, 41K. Therefore, the developing unit 20Y and the toner bottle 41Y for forming an image in yellow will be described here.

The toner bottle 41Y accommodates a yellow toner. The developer includes a non-magnetic toner and a magnetic carrier. The toner bottle 41Y is rotated with a toner bottle motor used as a drive source to discharge toner to the outside. The toner discharged from the toner bottle 41Y is supplied to the developing device 24Y. The toner bottle 41Y supplies a developer to the developing device 24Y when the remaining amount of toner accommodated in the developing device 24Y becomes equal to or smaller than a predetermined lower limit value.

An intermediate transfer belt 30 is suspended by a driving roller 33 and a driven roller 34 so as not to loosen. When the driving roller 33 rotates counterclockwise in FIG. 1, the intermediate transfer belt 30 rotates counterclockwise at a predetermined speed in FIG. 1. Due to the rotation of the intermediate transfer belt 30, the driven roller 34 rotates counterclockwise.

The developing unit 20Y accommodates a developer. The developer includes a non-magnetic toner and a magnetic carrier. The developing unit 20Y is supplied with toner by the toner bottle 41Y, and stirs the carrier and the toner. The developing unit 20Y forms a toner image with the toner included in the developer, and transfers the toner image onto the intermediate transfer belt 30. The timing for transferring toner images onto the intermediate transfer belt 30 by the developing unit 20Y is adjusted by detection of a reference mark provided on the intermediate transfer belt 30.

When forming a full-color image, the MFP 100 drives all of the developing units 20Y, 20M, 20C, 20K. Thus, toner images in yellow, magenta, cyan and black are superimposed on the intermediate transfer belt 30. When forming a monochrome image, the MFP 100 drives any one of the developing units 20Y, 20M, 20C, 20K. Further, it is also possible to form an image by combining two or more of the developing units 20Y, 20M, 20C, 20K.

In sheet feed cassettes 35, 35A, 35B, sheets in different sizes are respectively set. The sheets respectively accommodated in the sheet feed cassettes 35, 35A, 35B are supplied to a conveyance path by pickup rollers 36, 36A, 36B respectively attached to the sheet feed cassettes 35, 35A, 35B and are sent to a timing roller 31 by a sheet feed roller 37.

The timing roller 31 conveys a sheet conveyed by the sheet feed roller 37 to a nip portion between the intermediate transfer belt 30 and a secondary transfer roller 26 serving as a transfer member. The secondary transfer roller 26 generates an electric field in the nip portion. In this nip portion, due to the effect of an electric field force, a toner image formed on the intermediate transfer belt 30 is transferred onto a sheet conveyed by the timing roller 31. The sheet onto which the toner image is transferred is conveyed to a fixing roller 32 to be heated and pressurized by the fixing roller 32. Thus, the toner is fused and fixed to the sheet. Thereafter, the sheet is discharged to a sheet ejection tray 39. A belt cleaning blade 29 is provided upstream of the developing device 24Y of the intermediate transfer belt 30. The belt cleaning blade 29 removes the toner remaining on the intermediate transfer belt 30 without being transferred onto the sheet.

While using a tandem-system including the developing devices 24Y, 24M, 24C, 24K that respectively form toner on a sheet in four colors by way of example here, the MFP 100 may use a four-cycle system that sequentially transfers the toner of four colors onto a sheet using one photosensitive drum.

Figure 2:
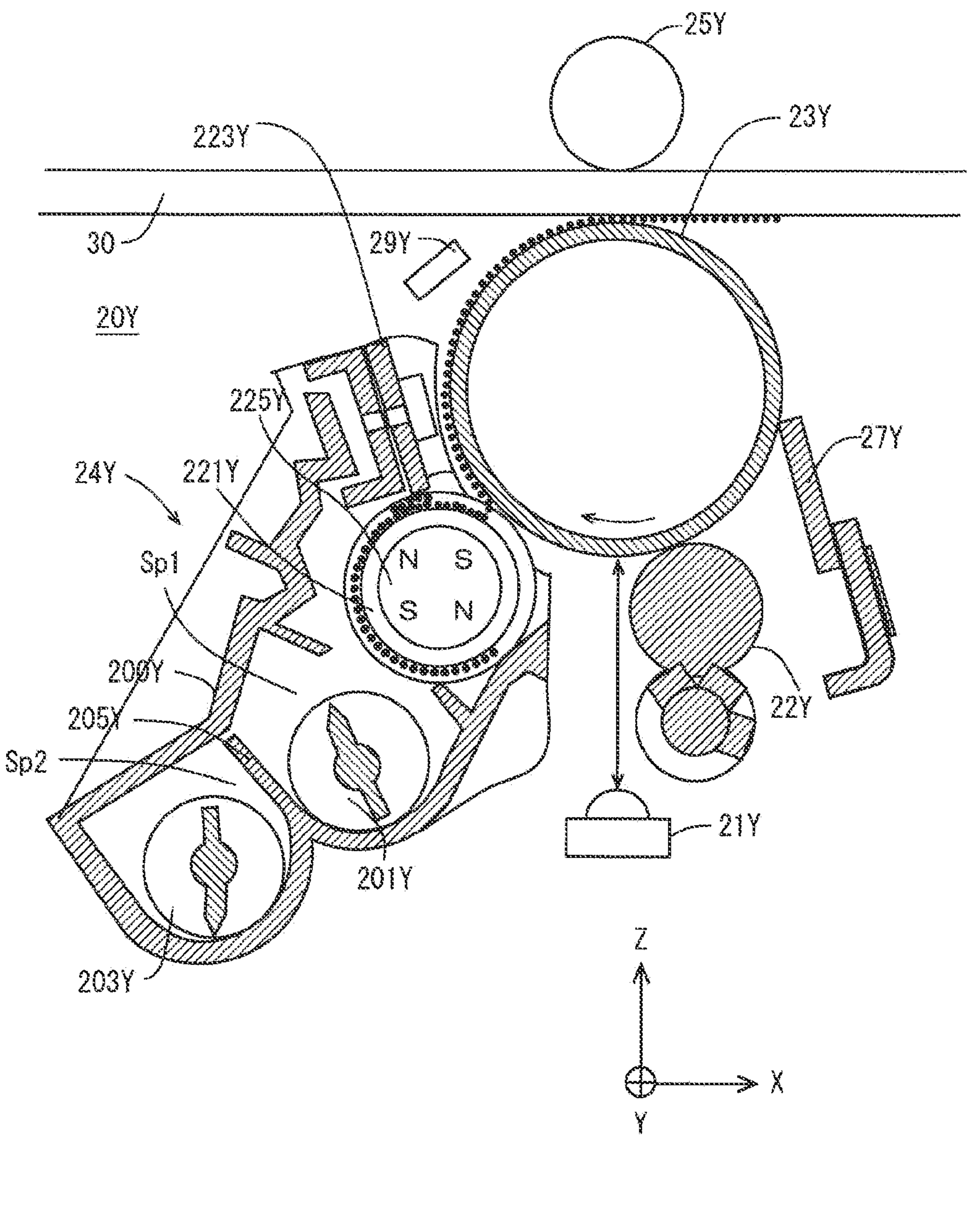
FIG. 2 is a cross-sectional view showing the details of a developing unit.

FIG. 2 is a cross-sectional view showing the details of the developing unit. FIG. 2 is a cross-sectional view of the developing unit 20Y taken along the plane orthogonal to the rotation axis of the photosensitive drum. With reference to FIG. 2, the developing unit 20Y includes the developing device 24Y, the photosensitive drum 23Y, a charging roller 22Y, an exposure unit 21Y, a primary transfer roller 25Y, a drum cleaning blade 27Y and a detection sensor 29Y.

The photosensitive drum 23Y is a cylindrical image bearing member, and a photoconductive layer is formed on the outer periphery of a conductive base made of aluminum or the like. The photosensitive drum 23Y is supported by a housing of the MFP 100 so as to be rotatable about a rotationally symmetric axis. Around the photosensitive drum 23Y, the charging roller 22Y, the exposure unit 21Y, the developing device 24Y, the detection sensor 29Y, the primary transfer roller 25Y and the drum cleaning blade 27Y are arranged in this order in the rotation direction of the photosensitive drum 23Y. The primary transfer roller 25Y is arranged above the photosensitive drum 23Y with the intermediate transfer belt 30 interposed therebetween. The charging roller 22Y uniformly charges the surface of the photosensitive drum 23Y which is the image bearing member. The drum cleaning blade 27Y removes the residual toner remaining on the photosensitive drum 23Y.

After being electrically charged by the charging roller 22Y, the photosensitive drum 23Y is irradiated with laser light emitted by the exposure unit 21Y. The exposure unit 21Y exposes a portion corresponding to an image on the surface of the photosensitive drum 23Y. An electrostatic latent image is formed on the exposed portion of the photosensitive drum 23Y.

The developing device 24Y forms a toner image on the photosensitive drum 23Y using the developer made of the carrier and toner. The developing device 24Y includes a housing 200Y, a first screw 201Y, a second screw 203Y, a developing roller 221Y and a restriction blade 223Y.

The housing 200Y is a housing that accommodates the developer, the first screw 201Y, the second screw 203Y, the developing roller 221Y and the restriction blade 223Y. A sensor for detecting an amount of the developer in the housing 200Y is attached to the housing 200Y. In a case in which the amount of developer detected by the sensor is smaller than a predetermined value, the developer is supplied from the toner bottle 41Y to the housing 200Y.

The developing roller 221Y, the first screw 201Y and the second screw 203Y are arranged side by side in the housing 200Y, and are rotatably supported by the housing 200Y. The direction in which the developing roller 221Y, the first screw 201Y and the second screw 203Y extend is the Y direction.

The housing 200Y is a container extending in the Y direction, and has two spaces including a first circulation tank Sp1 and a second circulation tank Sp2 into which the housing 200Y is divided by a partition wall 205Y extending in the Y direction. The first screw 201Y is provided in the first circulation tank Sp1, and the second screw 203Y is provided in the second circulation tank Sp2. Each of the first screw 201Y and the second screw 203Y has a shape in which a spiral blade is provided on the outer peripheral surface of the columnar rotation shaft extending in the Y direction, and conveys the developer by rotating. The first circulation tank Sp1 and the second circulation tank Sp2 are accommodating spaces for accommodating the developer.

Openings are provided at both end portions of the partition wall 205Y in the Y direction, and the first circulation tank Sp1 and the second circulation tank Sp2 are connected to each other through the openings. When the first screw 201Y rotates, the developer in the first circulation tank Sp1 is conveyed in the Y direction, and the developer conveyed to the end portion of the partition wall 205Y enters the second circulation tank Sp2 through the openings. When the second screw 203Y rotates, the developer in the second circulation tank Sp2 is conveyed in the direction opposite to the Y direction, and the developer conveyed to the end portion of the partition wall 205Y enters the first circulation tank Sp1 through the openings. In this manner, the developer is circulated in the first circulation tank Sp1 and the second circulation tank Sp2 by the first screw 201Y and the second screw 203Y.

The developing roller 221Y is provided in the first circulation tank Sp1 so as to be opposite to the first screw 201Y. Further, the developing roller 221Y is exposed from the housing 200Y. The portion of the developing roller 221Y that is exposed from the housing 200Y is opposite to the photosensitive drum 23Y. Specifically, the rotation shaft of the developing roller 221Y is rotatably supported by the housing 200Y such that a slight distance is maintained between the developing roller 221Y and the photosensitive drum 23Y. The developer includes a magnetic carrier and a non-magnetic toner. The developing roller 221Y adsorbs the magnetic carrier and the non-magnetic toner with use of a magnetic force of a roll portion 225Y arranged therein and bears the developer conveyed by the first screw 201Y. Hereinafter, the collection of the developer borne by the developing roller 221Y is referred to as a development brush.

The restriction blade 223Y is arranged in the vicinity of the developing roller 221Y. The both ends of the restriction blade 223Y are supported by the housing 200Y. The end portion of the restriction blade 223Y opposite to the developing roller 221Y is located at a position farther upstream in the circumferential direction than the portion of the surface of the developing roller 221Y that is the closest to the photosensitive drum 23Y. Therefore, an amount of the developer borne by the developing roller 221Y is restricted by the restriction blade 223Y. Specifically, in regard to the developer borne by the developing roller 221Y, the developer that comes into contact with the restriction blade 223Y is not borne by the developing roller 221Y as the developing roller 221Y rotates. The developer passing through the gap between the restriction blade 223Y and the developing roller 221Y reaches a development region in which the distance between the developing roller 221Y and the photosensitive drum 23Y is the shortest.

The developing roller 221Y develops an electrostatic latent image by applying toner to the photosensitive drum 23Y. Specifically, a developing bias is applied to the developing roller 221Y. Thus, the potential of the circumferential surface of the developing roller 221Y is lower than the potential (substantially 0 V) of a portion of the circumferential surface of the photosensitive drum 23Y where an electrostatic latent image is formed and higher than the potential of a portion of the photosensitive drum 23Y where an electrostatic latent image is not formed. Because being negatively charged, the toner in the developer borne by the developing roller 221Y adheres to the portion of the circumferential surface of the photosensitive drum 23Y where a latent electrostatic image is formed. Thus, a toner image is formed by the negatively charged toner in the portion of the circumferential surface of the photosensitive drum 23Y where an electrostatic latent image is formed.

The detection sensor 29Y detects the density of a toner image formed on the photosensitive drum 23Y. Specifically, the detection sensor 29Y is a reflection-type optical sensor, and emits light having a predetermined wavelength toward the surface of the photosensitive drum 23Y. The light emitted toward the surface of the photosensitive drum 23Y is irregularly reflected from the surface of the photosensitive drum 23Y or a toner image formed on the surface of the photosensitive drum 23Y. The detection sensor 29Y detects light reflected in a direction toward the detection sensor 29Y among the irregularly reflected light. The detection sensor 29Y outputs a detection value indicating a detected light amount. The amount of light received by the detection sensor 29Y varies depending on the density of a toner image formed on the photosensitive drum 23Y. The higher the density of a toner image, the smaller the light amount. Therefore, the density of a toner image borne by the photosensitive drum 23Y is detected based on an output value of the detection sensor 29Y.

A toner image formed on the photosensitive drum 23Y is transferred onto the intermediate transfer belt 30 which is an image bearing member by the primary transfer roller 25Y due to the effect of an electric field force. The toner remaining on the photosensitive drum 23Y without being transferred is removed from the photosensitive drum 23Y by the drum cleaning blade 27Y. Toner includes a cleaning component and a lubricating component. Therefore, the portion of the photosensitive drum 23Y bearing toner is cleaned while a friction force is reduced by the toner to be removed by the drum cleaning blade 27Y.

Figure 3:
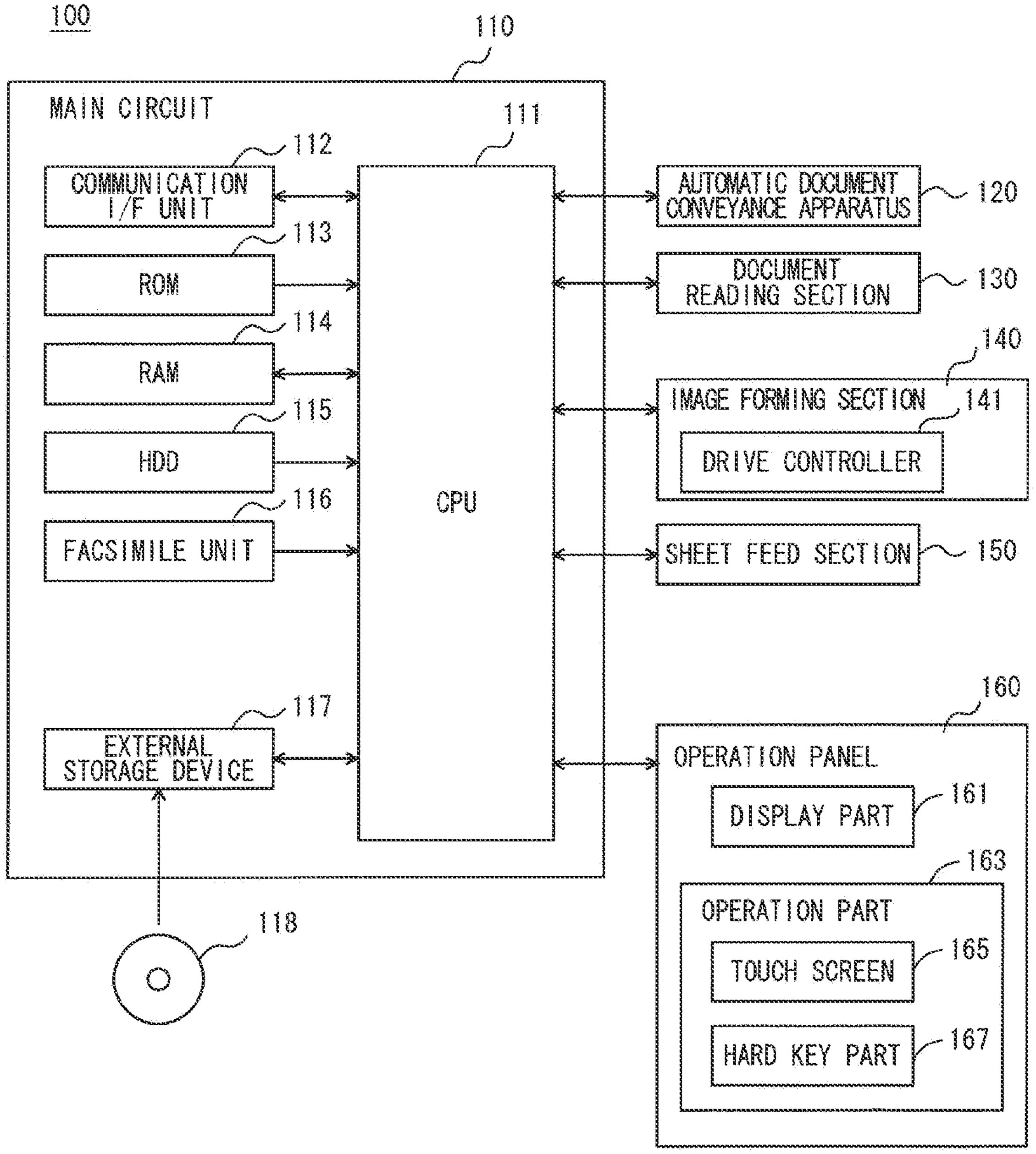
FIG. 3 is a block diagram showing the outline of the hardware configuration of the MFP in a first embodiment.

FIG. 3 is a block diagram showing the outline of the hardware configuration of the MFP in a first embodiment. With reference to FIG. 3, the MFP 100 includes a main circuit 110, the document reading section 130 for reading a document, the automatic document conveyance apparatus 120 for conveying a document to the document reading section 130, the image forming section 140 for forming an image on a sheet or other medium based on image data output by the document reading section 130 that has read a document, the sheet feed section 150 for feeding a sheet to the image forming section 140 and an operation panel 160 serving as a user interface.

The main circuit 110 includes a CPU 111, a communication interface (I/F) unit 112, a ROM 113, a RAM 114, a Hard Disc Drive (HDD) 115 that is used as a mass storage device, a facsimile unit 116 and an external storage device 117 mounted with a CD-ROM 118. The CPU 111 is connected to the automatic document conveyance apparatus 120, the document reading section 130, the image forming section 140, the sheet feed section 150 and the operation panel 160, and controls the MFP 100 as a whole.

The ROM 113 stores a program to be executed by the CPU 111 or data required for execution of the program. The RAM 114 is used as a work area when the CPU 111 executes a program. Further, the RAM 114 temporarily stores image data successively transmitted from the document reading section 130.

The communication I/F unit 112 is an interface for connecting the MFP 100 to a network. The CPU 111 communicates with a PC 200 via the communication OF unit 112, and transmits and receives data. Further, the communication I/F unit 112 can communicate with a computer connected to the Internet 5 via the network.

The facsimile unit 116 is connected to the Public Switched Telephone Network (PSTN), transmits facsimile data to the PSTN or receives facsimile data from the PSTN. The facsimile unit 116 stores the received facsimile data in the HDD 115 or outputs the received facsimile data to the image forming section 140. The image forming section 140 prints the facsimile data received by the facsimile unit 116 on a sheet. Further, the facsimile unit 116 converts the data stored in the HDD 115 into facsimile data and transmits the converted facsimile data to a facsimile machine connected to the PSTN.

The external storage device 117 is mounted with the CD-ROM 118. The CPU 111 can access the CD-ROM 118 via the external storage device 117. The CPU 111 loads a program recorded in the CD-ROM 118, which is mounted on the external storage device 117, into the RAM 114 for execution. It is noted that a medium for storing a program to be executed by the CPU 111 is not limited to the CD-ROM 118. It may be a flexible disc, a cassette tape, an optical disc (MO (Magnetic Optical Disc)/MD (Mini Disc)/DVD (Digital Versatile Disc)), an IC card, an optical card, and a semiconductor memory such as a mask ROM and an EPROM (Erasable Programmable ROM).

Further, the program to be executed by the CPU 111 is not limited to a program recorded in the CD-ROM 118, and the CPU 111 may load a program, stored in the HDD 115, into the RAM 114 for execution. In this case, another computer connected to the network may rewrite the program stored in the HDD 115 of the MFP 100 or may additionally write a new program therein. Further, the MFP 100 may download a program from another computer connected to the network and store the program in the HDD 115. The program referred to here includes not only a program directly executable by the CPU 111 but also a source program, a compressed program, an encrypted program and the like.

The operation panel 160 is provided on the upper surface of the MFP 100 and includes a display part 161 and an operation part 163. The display part 161 is a Liquid Crystal Display (LCD) device or an organic EL (Electroluminescence) display, for example, and displays instruction menus to users, information about the acquired image data and the like. The operation part 163 includes a touch screen 165 and a hard key part 167. The touch screen 165 is superimposed on the upper surface or the lower surface of the display part 161. The hard key part 167 includes a plurality of hard keys. The hard keys are contact switches, for example. The touch screen 165 detects a position designated by a user on the display surface of the display part 161.

The image forming section 140 includes a drive controller 141 that controls a developing bias and a charging bias.

Figure 4:
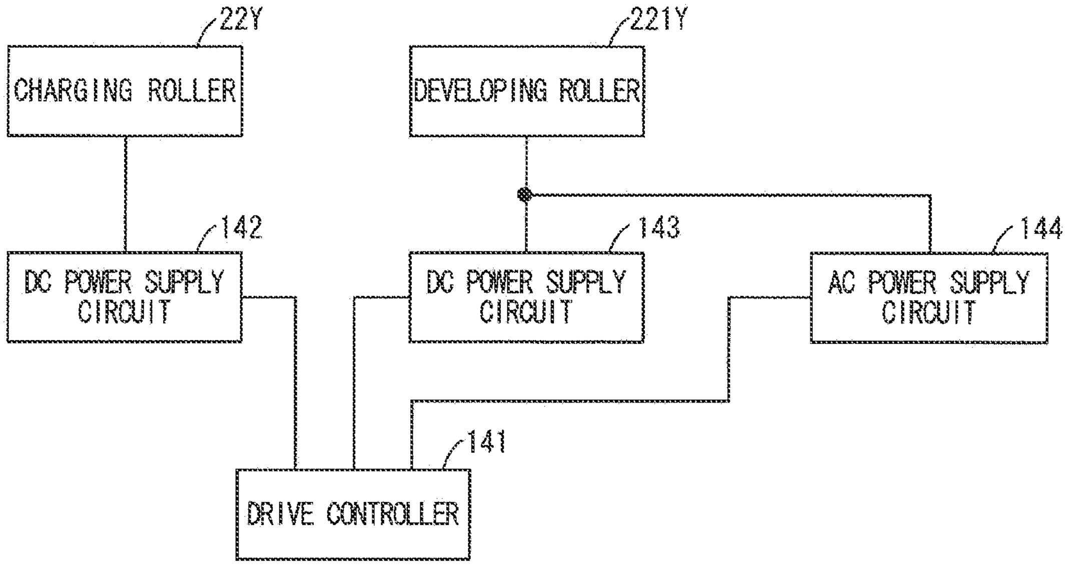
FIG. 4 is a block diagram for explaining a drive controller.

FIG. 4 is a block diagram for explaining a drive controller. With reference to FIG. 4, the drive controller 141 controls a developing bias and a charging bias for each of the developing devices 24Y, 24M, 24C, 24K for the colors Y, M, C and K. Here, the control for a developing bias and a charging bias by the developing device 24Y will be described. The drive controller 141 controls a DC power supply circuit 142 such that a DC voltage as a charging bias is applied to the charging roller 22Y. Further, the drive controller 141 controls a DC power supply circuit 143 such that a DC voltage as a developing bias is applied to the developing roller 221Y. The drive controller 141 may perform control such that a voltage obtained when an AC voltage is superimposed on a DC voltage is applied to the developing roller 221Y as a developing bias. In this case, the drive controller 141 controls an AC power supply circuit 144 such that an AC voltage as a developing bias is applied to the developing roller 221Y in parallel with the output of the DC power supply circuit 143.

Figure 5:
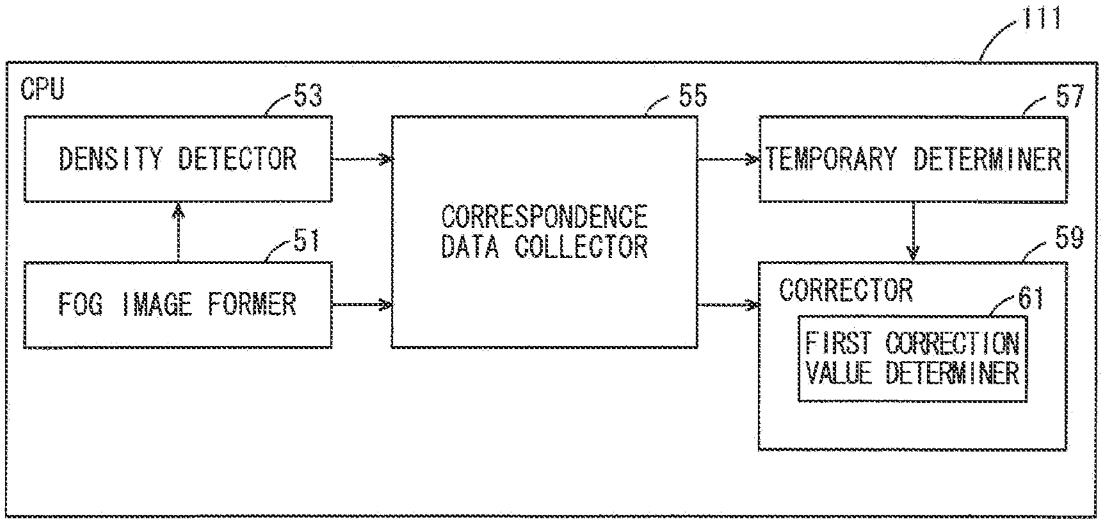
FIG. 5 is a block diagram showing one example of the functions of a CPU included in the MFP in the present embodiment.

FIG. 5 is a block diagram showing one example of the functions of a CPU included in the MFP in the present embodiment. The functions shown in FIG. 5 are implemented by the CPU 111 in a case in which the CPU 111 included in the MFP 100 executes an image forming program stored in the ROM 113, the HDD 115 or the CD-ROM 118.

With reference to FIG. 5, the CPU 111 includes a fog image former 51, a density detector 53, a correspondence data collector 55, a temporary determiner 57 and a corrector 59.

The fog image former 51 controls the image forming section 140 to form a fog image on the photosensitive drum 23Y. The fog image former 51 causes a fog image corresponding to a fog margin to be formed on the photosensitive drum 23Y. A fog margin is the voltage difference between a charging bias to be applied to the charging roller 22Y and a developing bias to be applied to the developing roller 221Y, and is a value obtained when the developing bias is subtracted from the charging bias. In a case in which a developing bias includes an AC component, a fog margin is a value obtained when a DC component of a developing bias is subtracted from a charging bias. A fog image is a toner image formed on the photosensitive drum 23Y in a case in which the image forming section 140 is operated with a developing bias that is defined based on a fog margin applied to the developing roller 221Y and with a charging bias that is defined based on a fog margin applied to the charging roller 22Y. In a period during which the fog image former 51 forms a fog image on the photosensitive drum 23Y, the photosensitive drum 23Y is not exposed by the exposure unit 21Y.

The fog image former 51 forms a plurality of fog images respectively corresponding to a plurality of fog margins on the photosensitive drum 23Y. The fog image former 51 outputs the values of a plurality of fog margins to the correspondence data collector 55 and the density detector 53. In the present embodiment, 21 fog images respectively corresponding to total 21 values of fog margins are formed on the photosensitive drum 23Y with a fog margin set for every 10 V and with the fog margins ranging from −50 V to 150 V.

The density detector 53 controls the detection sensor 29Y and acquires the output of the detection sensor 29Y that detects light reflected from a fog image formed on the photosensitive drum 23Y. The toner density of a fog image is calculated based on the output of the detection sensor 29Y. The higher the toner density, the smaller an output value of the detection sensor 29Y. The density detector 53 outputs an output value of the detection sensor 29Y to the correspondence data collector 55.

The correspondence data collector 55 generates correspondence data in which a fog margin and an output value of the detection sensor 29Y are associated with each other. The correspondence data collector 55 associates an output value received from the detection sensor 29Y at a point in time at which a fog image formed on the photosensitive drum 23Y by the fog image former 51 reaches a detection range where the detection sensor 29Y can detect toner with a value of a fog margin used for forming the fog image. The same number of correspondence data pieces as the number of fog images formed by the fog image former 51 on the photosensitive drum 23Y are generated. In the present embodiment, 21 correspondence data pieces are generated.

The temporary determiner 57 determines a temporary fog margin based on a plurality of correspondence data pieces. The larger a fog margin, the smaller the density of a fog image. Meanwhile, the detection accuracy of the detection sensor 29Y is limited. When the density of a fog image exceeds the range of detection accuracy of the detection sensor 29Y and becomes equal to or smaller than a predetermined value, an output value of the detection sensor 29Y becomes a value in a predetermined range. Therefore, it is not possible to accurately determine that a fog image is not formed only based on the output of the detection sensor 29Y.

Figure 6:
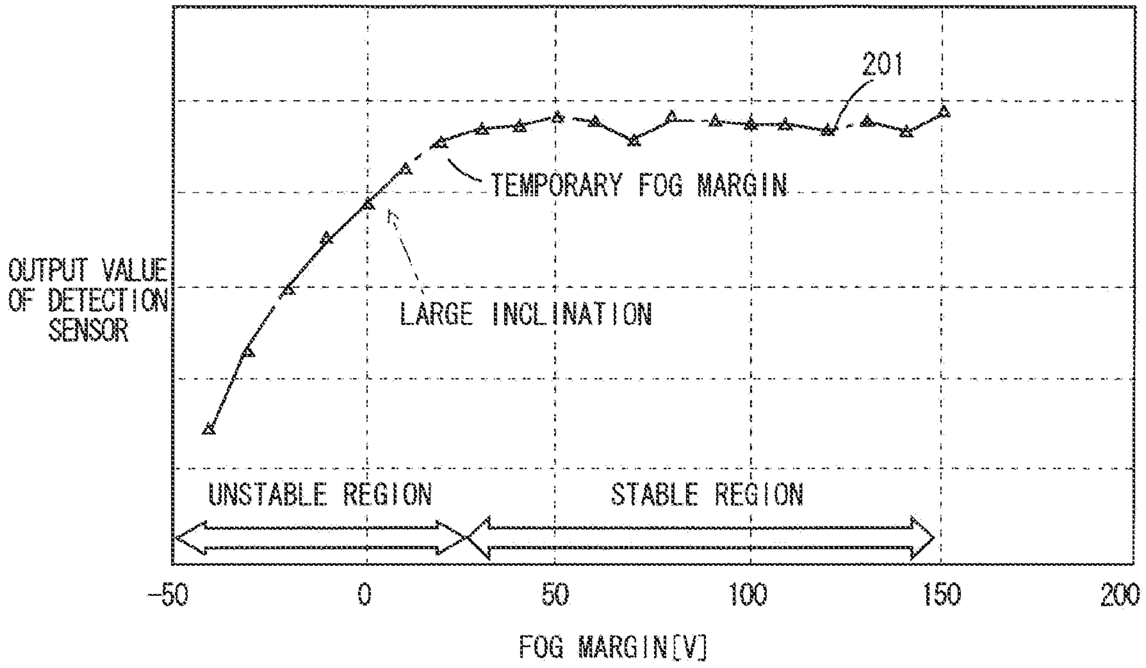
FIG. 6 is a first graph showing one example of correspondence data.

FIG. 6 is a first graph showing one example of correspondence data. The abscissa of FIG. 6 represents a fog margin (V), and the ordinate represents an output value of the detection sensor 29Y. A curve 201 represents the change in output value of the detection sensor 29Y caused by the change in fog margin. An output value of the detection sensor 29Y indicates a difference from an output value obtained in a case in which there is no shielding object (i.e., fog toner) on the surface of the photosensitive drum 23Y which is a detection subject of the detection sensor 29Y.

According to FIG. 6, in a case in which a fog margin is small, an output value of the detection sensor 29Y is small. An output value of the detection sensor 29Y increases as a fog margin increases. In the unstable region where a fog margin is between −50 V and 20 V, the smaller a fog margin, the larger the toner amount of a fog image, and the larger a fog margin, the smaller the toner amount of a fog image. In the stable region where a fog margin is equal to or larger than 20 V, an output value of the detection sensor 29Y is in a predetermined range and saturated.

Referring back to FIG. 5, the temporary determiner 57 determines a temporary fog margin based on a change rate, which is the rate of the change amount of an output value of the detection sensor 29Y with respect to the change amount of a fog margin.

The temporary determiner 57 calculates the change rate for each fog margin with use of correspondence data. Here, a fog margin is denoted by M(i), and an output value of the detection sensor 29Y corresponding to the fog margin M(i) is denoted by V(i). 'i' is a positive integer and a value that identifies a fog margin. Here, the fog margin in a case in which i=1 is −50 V, and the fog margin in a case in which i=21 is +150 V. A fog margin that is larger than the fog margin M(i) by 10 V is denoted by M(i+1). An increase rate ΔV(i) of an output value of the detection sensor 29Y with respect to the fog margin M(i) is calculated with use of the following formula (1). 'i' is an integer larger than 1. Further, the change rate δ(j) that represents the change of the increase rate ΔV(j) is calculated with use of the following formula (2). j is an integer larger than 2.

$$\text{The increase rate } \Delta V(i)=(V(i)-V(i-1))/(M(i)-MI(i-1)). \quad (1)$$

$$\text{The change rate } \delta(j)=(\Delta V(j)-\Delta V(j-2))/(M(j)-M(j-2)). \quad (2)$$

The temporary determiner 57 determines a fog margin M(J) having the smallest variable j among a plurality of change rates δ(j), with the difference between the change rate δ(j) and the change rate δ(j−1) being equal to or smaller than a predetermined threshold value in regard to the plurality of change rates δ(j). J is the suffix of the smallest change rate δ(j) among the plurality of change rates δ(j) that correspond to the difference between a change rate δ(j) and a change rate δ(j−1) being equal to or smaller than the predetermined threshold value. The temporary determiner 57 sets the fog margin M(J) as a temporary fog margin. The temporary determiner 57 outputs a temporary fog margin to the corrector 59.

The temporary determiner 57 may calculate a change rate δ(j) based on an increase rate ΔV(j) and an increase rate ΔV(j−1). Further, the temporary determiner 57 may calculate a change rate δ(j) based on an increase rate ΔV(j) and an increase rate ΔV(j−3). Further, the temporary determiner 57 may calculate a change rate δ(j) based on the ratio between an increase rate ΔV(j) and an increase rate ΔV(j−1). Further, the temporary determiner 57 may calculate a change rate δ(j) based on the ratio between an increase rate ΔV(j) and an increase rate ΔV(j−1).

The corrector 59 corrects a temporary fog margin received from the temporary determiner 57. The corrector 59 includes a first correction value determiner 61. As described above, a temporary fog margin is the smallest value of density of a fog image detectable by the detection sensor 29Y. The corrector 59 corrects a temporary fog margin in regard to a portion exceeding the detection accuracy of the detection sensor 29Y by using an output value output by the detection sensor 29Y in the range of detection accuracy.

Here, the relationship between the deterioration state of a developer accommodated in the developing device 24Y and a fog margin will be described. In regard to a developer accommodated in the developing device 24Y, charging performance of toner is degraded together with deterioration of toner. It is known that a difference in charging performance of toner affects the density of fog image with respect to a fog margin. Generally, when toner charge distributions of a non-deteriorated toner and a deteriorated toner are compared, dispersion of the non-deteriorated toner is larger than dispersion of the non-deteriorated toner.

Figure 7:
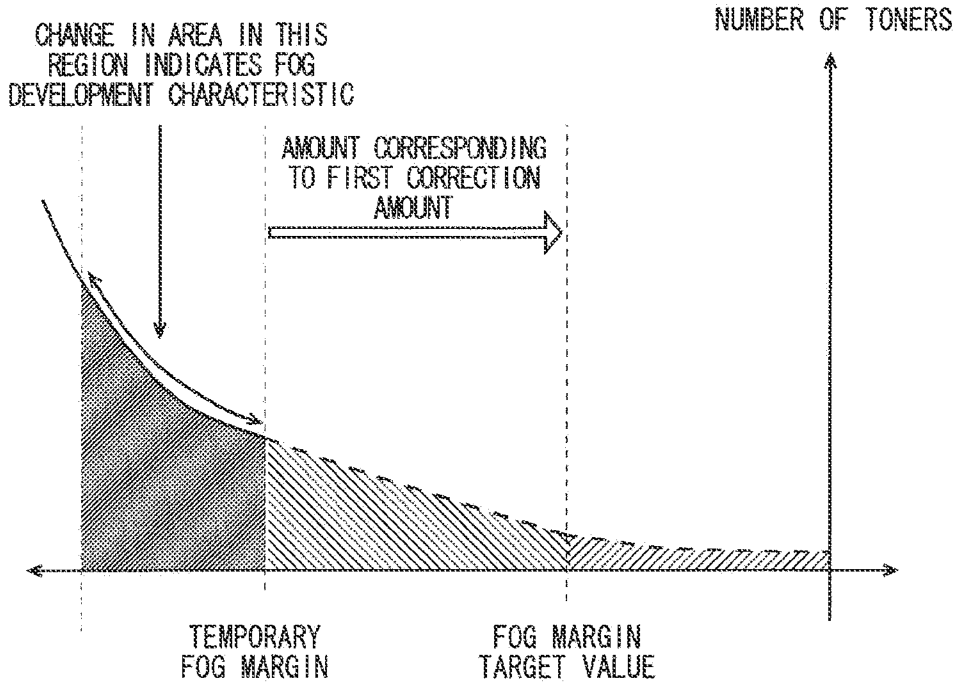
FIG. 7 is a diagram showing part of the charge distribution of a deteriorated toner.
Figure 8:
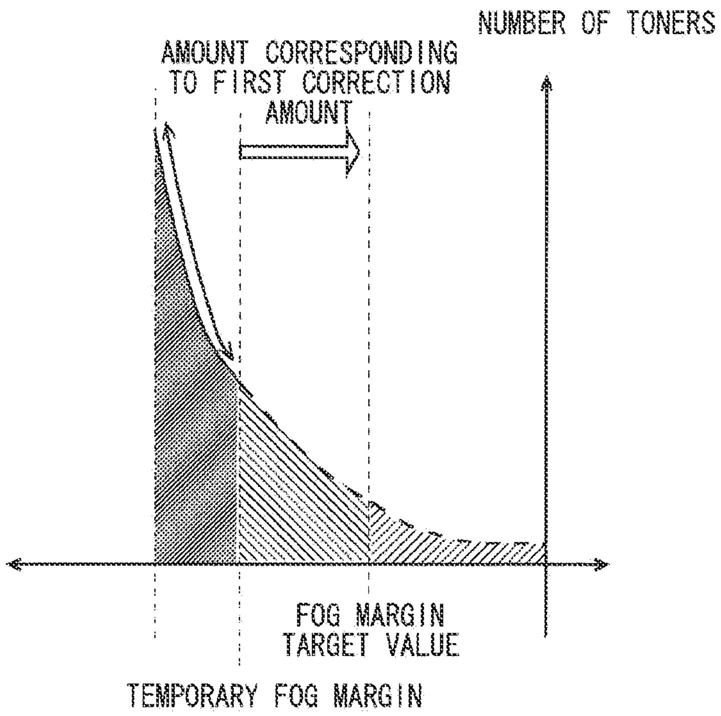
FIG. 8 is a diagram showing part of the charge distribution of a non-deteriorated toner.

FIG. 7 is a diagram showing part of the charge distribution of a deteriorated toner. FIG. 8 is a diagram showing part of the charge distribution of a non-deteriorated toner. In each of FIGS. 7 and 8, the abscissa represents a charge amount of toner. The farther rightward in the abscissa, the smaller a change amount. The ordinate represents the number of toners. In each of FIGS. 7 and 8, the portion representing a lower charge amount in the charge distribution of toner is shown. Further, the areas of the two portions to which the same hatching is applied are the same. In a case in which toner stored in the developing device 24Y is deteriorated, the standard deviation of charge distribution is large. Further, in a case in which toner stored in the developing device 24Y is not deteriorated, the standard deviation of charge distribution is small.

Further, in each of FIGS. 7 and 8, a temporary fog margin and a fog amount target value are shown in regard to the charge amount of toner. The charge amount corresponding to a temporary fog margin indicates the charge amount of toner that does not form a fog image. In regard to toner the charge amount of which is larger than a temporary fog margin, a fog image is not formed. In regard to toner the charge amount of which is smaller than a temporary fog margin, a fog margin may be formed or may not be formed.

Here, in a case in which the charge distribution of toner is known, in regard to toner the charge amount of which is smaller than the charge amount corresponding to a temporary fog margin, it is possible to predict a charge amount at which a fog image is not formed. Here, a value corresponding to a predicted charge amount of toner that does not form a fog image is referred to as a fog margin target value. Specifically, the charge amount of toner which is a fog margin target value can be defined based on the ratio of a change in number of toners with respect to a change in charge amount of toner having the charge amount smaller than the charge amount corresponding to a temporary fog margin. For example, the charge amount corresponding to a fog margin target value is defined such that the number of toners having a charge amount that is equal to or smaller than the charging amount corresponding to a fog margin target value and equal to or larger than the charging amount corresponding to a temporary fog margin is the same as a predetermined number of toners having charge amounts smaller than the temporary fog margin. In the diagram, the difference between the charge amount corresponding to a fog margin target value and the charge amount corresponding to a temporary fog margin is shown as an amount corresponding to a first correction amount for correcting a temporary fog margin. The predetermined number can be defined by experiment.

With reference to FIGS. 7 and 8, in regard to the charge distribution of a non-deteriorated toner shown in FIG. 8, a change in number of toners having a higher charge amount than a charge amount corresponding to the temporary fog margin is more abrupt than that in the charge distribution of a deteriorated toner shown in FIG. 7. Therefore, an amount corresponding to a first correction amount for a non-deteriorated toner is smaller than that for a deteriorated toner.

Figure 9:
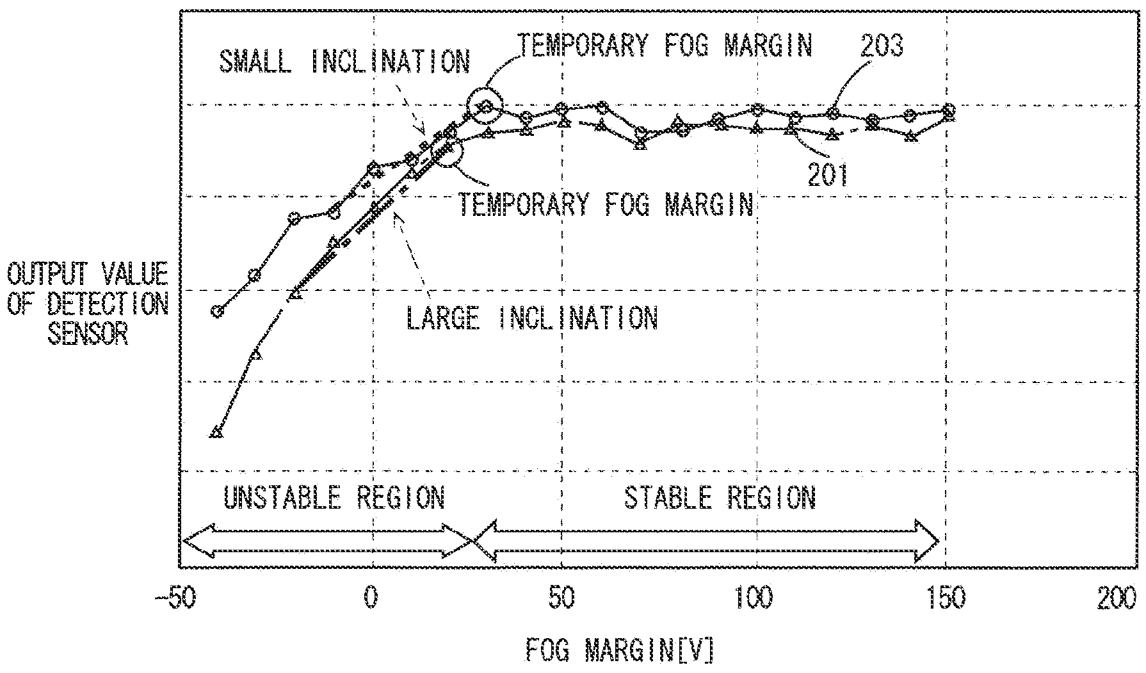
FIG. 9 is a second graph showing one example of correspondence data.

FIG. 9 is a second graph showing one example of correspondence data. The abscissa of FIG. 9 represents a fog margin (V), and the ordinate represents an output value of the detection sensor 29Y. The curve 201 represents the change in output value of the detection sensor 29Y caused by the change in fog margin in regard to a non-deteriorated toner. A curve 203 represents the change in output value of the detection sensor 29Y caused by the change in fog margin in regard to a deteriorated toner.

When the curve 201 and the curve 203 are compared, the inclination of the curve 201 is larger than the inclination of the curve 203 in the unstable region. It is known that the difference in charge distribution caused by deterioration of toner has a correlation with the inclination of each of the curves 201, 203 in the unstable region. In a case in which the curve 203 having a small inclination in the unstable region is obtained, the standard deviation is large in the charge distribution of toner stored in the developing device 24Y. Further, in a case in which the curve 201 having a large inclination in the unstable region is obtained, the standard deviation is small in the charge distribution of toner stored in the developing device 24Y.

Referring back to FIG. 5, the first correction value determiner 61 defines a normally assumed distribution, and corrects the temporary fog margin by using an offset margin with respect to a fog margin target value in regard to a fog developing characteristic as a correction center value and a change amount in regard to a fog developing characteristic as a variation. Here, the fog developing characteristic S(i) is a value calculated by the formula (3). $S(i)=(V(i)-V(i-3))/(M(I)-MI(i-3))$ . . . (3) The above formula holds when $i>3$ and $i=J$.

The first correction value determiner 61, in advance, defines a correction value for correcting a temporary fog margin to a fog margin target value as a standard value in regard to the standard charge distribution of toner, and determines, as the first correction value, a value obtained when a fog margin caused by a variation in charge distribution of toner is fed back to the standard correction value. Specifically, the first correction value determiner 61 stores in advance a first correction table that is obtained when the relationship between a fog developing characteristic and a correction amount is obtained by an experiment. In the experiment for creating this table, the toner amount of a fog image is measured by collection of toner of a fog image actually formed on the photosensitive drum 23Y.

In a case in which a fog developing characteristic is equal to or smaller than a predetermined threshold value, the first correction value determiner 61 sets the first correction value to a predetermined upper limit value. In a case in which a fog developing characteristic is equal to or smaller than a predetermined value, it is predicated that the charge distribution of toner is not a normal distribution and includes two or more normal distributions. In this case, the fog developing characteristic does not represent the charge distribution of toner.

Figure 10:
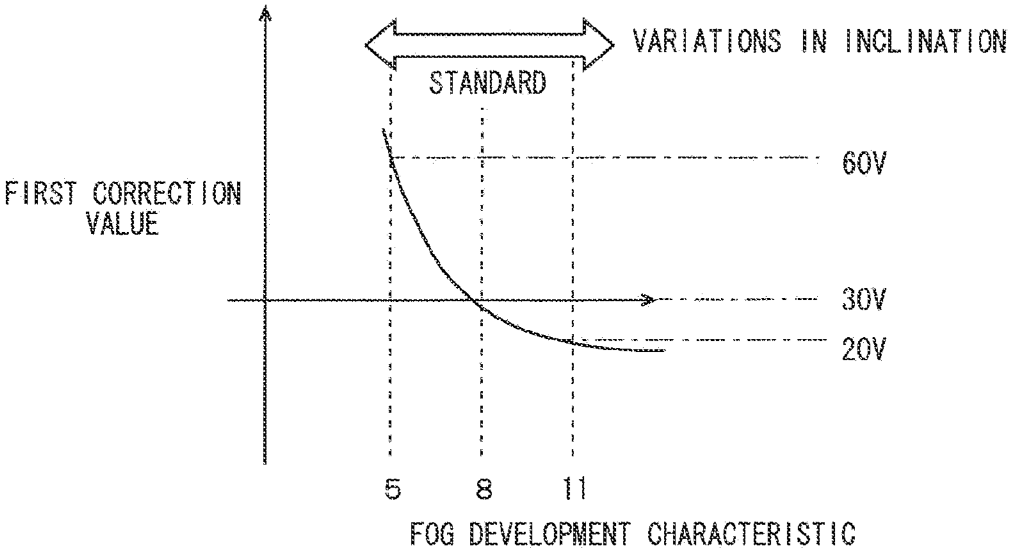
FIG. 10 is a diagram showing one example of a first correction table.

FIG. 10 is a diagram showing one example of a first correction table. In FIG. 10, the abscissa represents a fog developing characteristic, and the ordinate represents the first correction value. Here, points obtained by plotting of the values of the table are shown in an approximate graph. With reference to FIG. 10, the charge distribution of toner in a case in which the fog developing characteristic is "8" is set as the standard charge distribution of toner. Further, it is indicated that the first correction value is "30 V" in this case. Further, the first correction value "60 V" is defined with respect to the charge distribution of toner having the fog developing characteristic of "5." Further, the first correction value "20 V" is defined with respect to the charge distribution of toner having the fog developing characteristic of "11." In the correction table, the first correction value is set such that the smaller the fog developing characteristic, the larger the first correction value. While the first correction value is obtained with use of the table by way of example here, an arithmetic expression expressing the relationship between the fog developing characteristic and the first correction value shown in the graph of FIG. 10 may be used.

Figure 11:
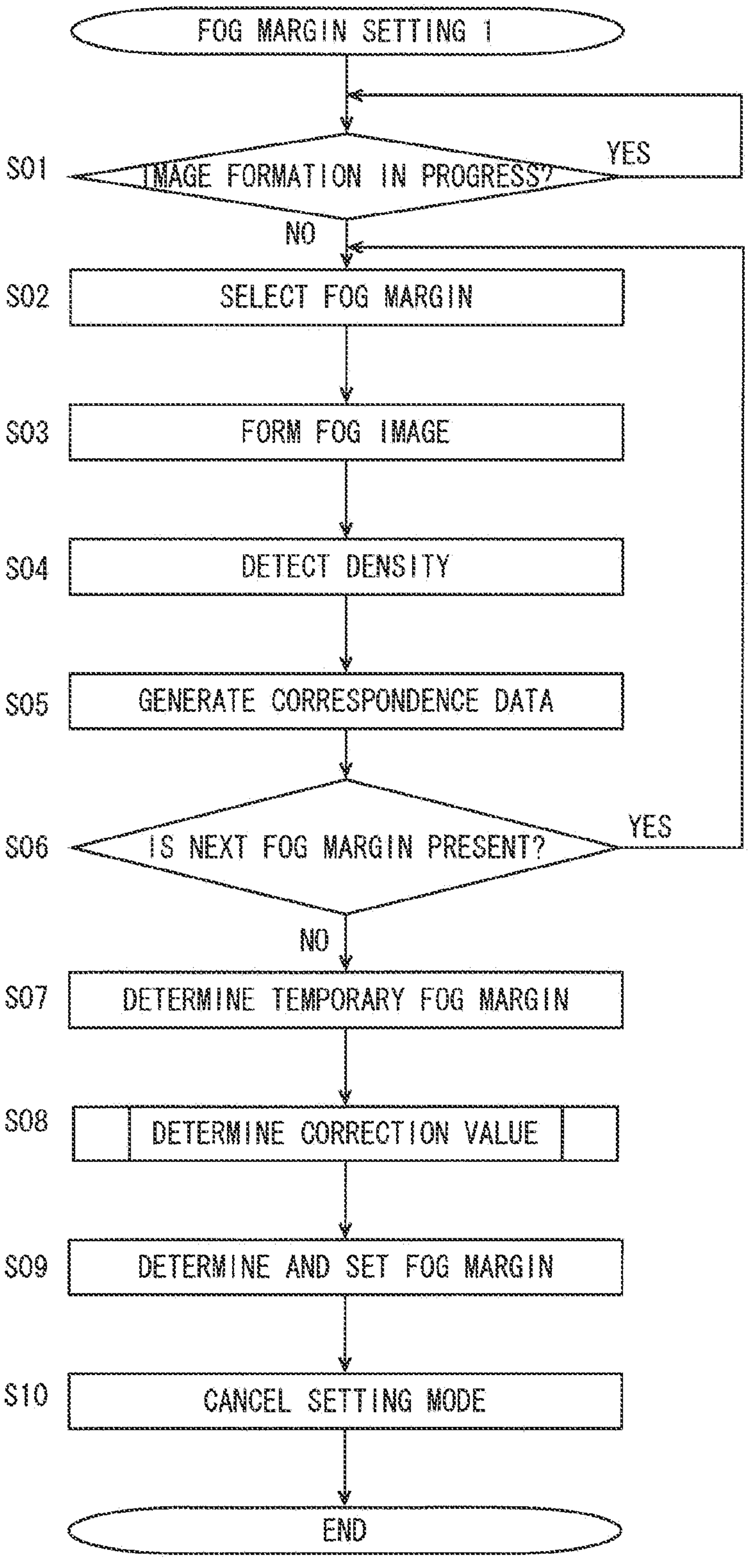
FIG. 11 is a flowchart showing one example of a flow of a fog margin setting process.

FIG. 11 is a flowchart showing one example of a flow of a fog margin setting process. The fog margin setting process is a process executed by the CPU 111 of the MFP 100 when the CPU 111 executes a fog margin setting program stored in the ROM 113, the HDD 115 or the CD-ROM 118.

With reference to FIG. 11, the CPU 111 included in the MFP 100 determines whether image formation is in progress. If image formation is in progress, the process waits (YES in the step S01). If not (NO in the step S01), the process proceeds to the step S02. In a case in which the process proceeds to the step S02, a mode for setting a fog margin is set. In the mode for setting a fog margin, image formation processing is prohibited.

In the step S02, a fog margin is selected, and the process proceeds to the step S03. A fog margin subject to the process is selected from among a plurality of predetermined fog margins. In the step S03, a fog image is formed, and the process proceeds to the step S04. Respective voltages for a developing bias and a charging bias defined based on the fog margin are determined, and a development process is executed without exposure of the photosensitive drums 23Y, 23M, 23C, 23K. Thus, fog images are respectively formed on the photosensitive drums 23Y, 23M, 23C, 23K.

In the step S04, the density of the fog image is detected, and the process proceeds to the step S05. The output values of the detection sensors 29Y, 29M, 29C, 29K are acquired.

In the step S05, correspondence data is generated, and the process proceeds to the step S06. The correspondence data that includes the fog margin selected in the step S02 and the respective output values of the respective detection sensors 29Y, 29M, 29C, 29K acquired in the step S04 is generated and stored in HDD 115. The correspondence data is generated for each of the developing units 20Y, 20M, 20C, 20K.

In the step S06, whether a fog margin that is not selected as a process subject is present is determined. If an unselected fog margin is present, the process returns to the step S02. If not, the process proceeds to the step S07. Correspondence data pieces respectively corresponding to a plurality of fog margins prepared in advance are generated by repetition of the process from the step S02 to the step S06.

In the step S07, a temporary fog margin is determined, and the process proceeds to the step S08. A temporary fog margin is determined for each of the developing units 20Y, 20M, 20C, 20K. An increase rate $\Delta V(i)$ for each of the plurality of fog margins is determined with use of the formula (1), and a change rate $\delta(j)$ for each of the plurality of fog margins is determined with use of the formula (2). Then, a fog margin $M(J)$ having the smallest variable j among a plurality of change rates $\delta(j)$ is determined as a temporary fog margin, with the difference between the change rate $\delta(j)$ and the change rate $\delta(j-1)$ being equal to or smaller than the predetermined threshold value in regard to each of the plurality of change rates $\delta(j)$. J is the suffix of the smallest change rate $\delta(j)$ among the plurality of change rates $\delta(j)$ that correspond to the difference between the change rate $\delta(j)$ and the change rate $\delta(j-1)$ being equal to or smaller than the predetermined threshold value.

In the step S08, a correction value is determined, and the process proceeds to the step S09. A correction value is determined for each of the developing units 20Y, 20M, 20C, 20K. Based on the charge distribution of toner stored in each of the developing devices 24Y, 24M, 24C, 24K, a correction value of a temporary fog margin is determined.

In the step S09, a fog margin is determined and set, and the process proceeds to the step S10. A fog margin is determined and set for each of the developing units 20Y, 20M, 20C, 20K. A temporary fog margin is corrected with the correction value determined in the step S08, and the corrected temporary fog margin is determined as a fog margin. Then, the determined fog margin is set.

In the step S10, a mode for setting a fog margin is canceled, and the process ends. Thus, it is set that image formation is executable.

First Modification Example

Figure 12:
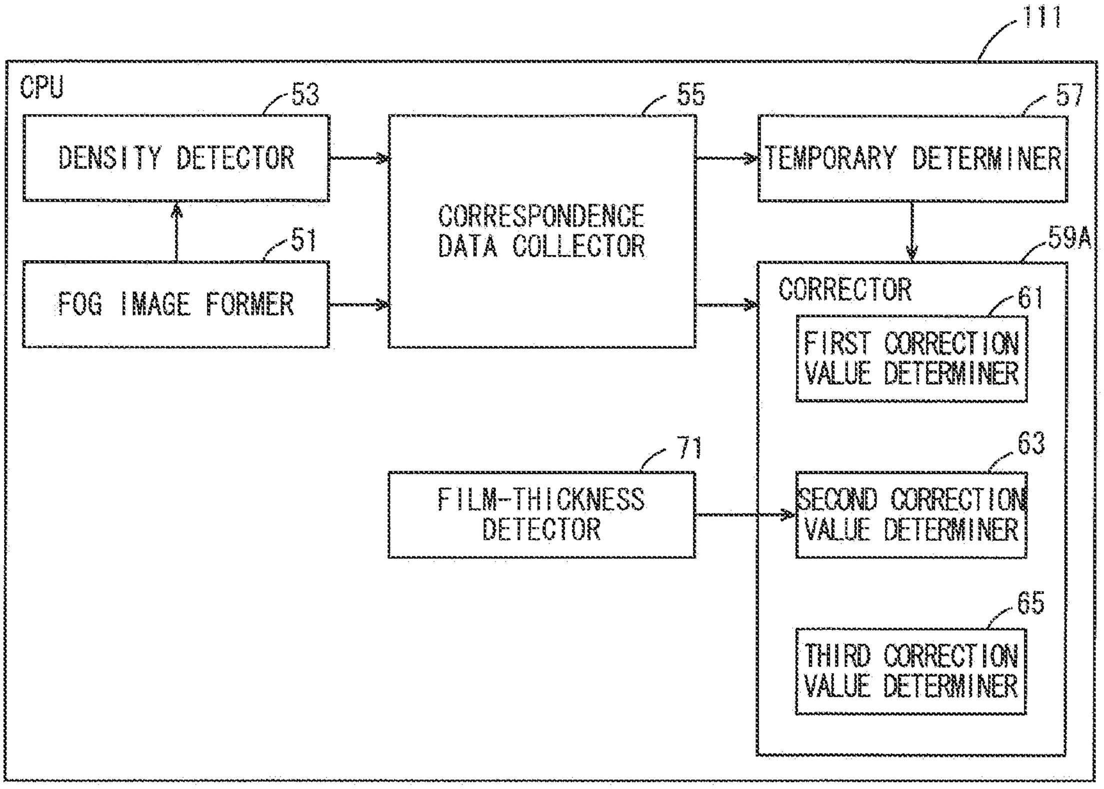
FIG. 12 is a block diagram showing one example of the functions of a CPU included in an MFP according to the present embodiment in a first modification example.

FIG. 12 is a block diagram showing one example of the functions of a CPU included in an MFP according to the present embodiment in a first modification example. With reference to FIG. 12, the functions are different from those shown in FIG. 5 in that a film-thickness detector 71 is added, and the corrector 59 is changed to a corrector 59A. The other functions are the same as the functions shown in FIG. 5. A description therefore will not be repeated. The corrector 59A includes a second correction value determiner 63 and a third correction value determiner 65 in addition to a first correction value determiner 61.

The film-thickness detector 71 detects a film thickness of the photosensitive drum 23Y and outputs the detected film thickness to the second correction value determiner 63. A film thickness of the photosensitive drum 23Y has a correlation with a charging current flowing through the charging roller 22Y. Therefore, the film-thickness detector 71 converts a charging current into a film thickness of the photosensitive drum 23Y by detecting the charging current flowing through the charging roller 22Y.

The second correction value determiner 63 determines a second correction value based on the film thickness of the photosensitive drum 23Y, and corrects a first correction value based on the second correction value. When a film thickness of the photosensitive drum 23Y changes, the film-thickness resistance decreases. As a result, the strength of an electric field generated in a developing nip between the photosensitive drum 23Y and the developing roller 221Y increases. Thus, a fog developing characteristic changes and increases.

A fog developing characteristic used in a case in which the first correction value determiner 61 obtains a first correction value is obtained on the assumption that the photosensitive drum 23Y is an initial state where its film thickness is maximum. Therefore, in a case in which the film thickness of the photosensitive drum 23Y has changed from the initial state, it is necessary to convert a fog developing characteristic into the fog developing characteristic corresponding to the initial film thickness of the photosensitive drum 23Y. It is confirmed by experiment that even when the voltage of a charging bias is the same, the output value of the detection sensor 29Y converges early and a temporary fog margin becomes a small value because the actual electric field strength in the developing nip changes due to the film thickness of the photosensitive drum 23Y.

Because a film thickness of the photosensitive drum 23Y and an electric field strength in the developing nip are inversely proportional to each other, the second correction value determiner 63 obtains a fog developing characteristic with the film thickness in the initial state of the photosensitive drum 23Y by converting the voltage of a charging bias with use of the change rate of film thickness. Specifically, the second correction value determiner 63 corrects the first correction value based on the second correction value, which is an increase amount of an electric field strength defined based on the difference between the film thickness of the photosensitive drum 23Y received from the film-thickness detector 71 and the film thickness of the photosensitive drum 23Y in the initial state. In advance, the second correction value determiner 63 prepares a second correction table that defines the relationship between a decrease amount of the film thickness of the photosensitive drum 23Y and the second correction value. The second correction value determiner 63 obtains the difference between the film thickness of the photosensitive drum 23Y received from the film-thickness detector 71 and the film thickness of the photosensitive drum 23Y in the initial state, and determines the second correction value with reference to the second correction table. Because the second correction value determiner 63 corrects the first correction value based on the second correction value in accordance with the film thickness of the photosensitive drum 23Y, it is possible to accurately determine a fog margin.

The third correction value determiner 65 corrects the first correction value based on the distance between the photosensitive drum 23Y and the developing roller 221Y. Hereinafter, the distance between the photosensitive drum 23Y and the developing roller 221Y is referred to as a developing gap. A developing gap may vary due to variations in size of the photosensitive drum 23Y and the developing roller 221Y. Due to variations of a developing gap, an electric field strength in a developing nip varies. As a result, a fog developing characteristic is affected.

<In Case of Replacement at Same Time>

First, in the following description, the photosensitive drum 23Y and the developing roller 221Y are replaced at the same time. A fog developing characteristic used by the first correction value determiner 61 for acquisition of the first correction value is based on a standard developing gap. Therefore, it can be assumed that the fog developing characteristic determined by the first correction value determiner 61 is detected for a new toner having a distribution with a predetermined standard deviation.

With the fog developing characteristic for the standard developing gap as a reference, the third correction value determiner 65 calculates a developing gap by comparing a fog developing characteristic for a temporary fog margin determined by the first correction value determiner 61 with the reference fog developing characteristic. Specifically, it is known that the developing gap and the fog developing characteristic are proportional to each other. In advance, the third correction value determiner 65 prepares a developing gap table in which the ratio of the fog developing characteristic for the temporary fog margin determined by the first correction value determiner 61 with respect to the reference fog developing characteristic is associated with the developing gap. The third correction value determiner 65 obtains the ratio between the fog developing characteristic for the temporary fog margin determined by the first correction value determiner 61 and the reference fog developing characteristic for the developing gap, and determines a developing gap with reference to the developing gap table.

Further, in advance, the third correction value determiner 65 prepares a third correction table defining the relationship between the ratio between the calculated developing gap and the reference developing gap, and a third correction value. The third correction value determiner 65 obtains the ratio between the calculated developing gap and the reference developing gap, and determines a third correction value with reference to the third correction table. The third correction value determiner 65 corrects the first correction value based on the third correction value. Because the third correction value determiner 65 corrects the first correction value based on the third correction value in accordance with the developing gap, a fog margin can be accurately determined.

<In Case of Replacement of Only Photosensitive Drum>

Next, in the following description, the photosensitive drum 23Y is replaced, and the developing device 24Y is not replaced. In this case, the electric field strength changes due to a change in developing gap caused by the replacement of the photosensitive drum 23Y. Therefore, the third correction value determiner 65 determines a fourth correction value on the assumption that there is no change in charge distribution of toner stored in the developing device 24Y before and after the replacement of the photosensitive drum 23Y.

The fog developing characteristic for the last detected temporary fog margin before the replacement of the photosensitive drum 23Y includes a change in electric field strength corresponding to a decrease in film thickness of the photosensitive drum 23Y. Therefore, based on the film thickness of the photosensitive drum 23Y before the replacement of the photosensitive drum 23Y, the third correction value determiner 65 converts the fog developing characteristic for the last detected temporary fog margin before the replacement of the photosensitive drum 23Y into the fog developing characteristic for the film thickness of the photosensitive drum 23Y in the initial state. The fog developing characteristic obtained when the fog developing characteristic for the last detected temporary fog margin before the replacement of the photosensitive drum 23Y is converted is referred to as a pre-replacement developing characteristic.

The third correction value determiner 65 obtains a developing gap based on the ratio between the fog developing characteristic for the temporary fog margin calculated by the first correction value determiner 61 immediately after the replacement of the photosensitive drum 23Y and the pre-replacement characteristic.

The third correction value determiner 65 obtains the ratio between the calculated developing gap and the reference developing gap, and determines the fourth correction value with reference to the third correction table. The third correction value determiner 65 corrects the first correction value based on the fourth correction value. Because the third correction value determiner 65 corrects the first correction value based on the fourth correction value in accordance with a developing gap, a fog margin can be accurately determined.

<In Case of Replacement of Only Developing Device>

Next, in the following description, the developing device 24Y is replaced, and the photosensitive drum 23Y is not replaced. In this case, the electric field strength changes due to a change in developing gap caused by the replacement of the developing device 24Y. A fog developing characteristic obtained immediately after the replacement of the developing device 24Y is affected by a change in electric field strength due to wear of the film thickness of the photosensitive drum 23Y. Therefore, based on the film thickness of the photosensitive drum 23Y after the replacement of the photosensitive drum 23Y, the third correction value determiner 65 converts a fog developing characteristic for a temporary fog margin into a fog developing characteristic for the film thickness of the photosensitive drum 23Y in the initial state. The developing characteristic obtained when the fog developing characteristic for the temporary fog margin detected after the replacement of the photosensitive drum 23Y is converted is referred to as a post-replacement developing characteristic.

The third correction value determiner 65 obtains a developing gap based on the ratio between the fog developing characteristic for the temporary fog margin calculated by the first correction value determiner 61 immediately after the replacement of the photosensitive drum 23Y and the post-replacement developing characteristic.

The third correction value determiner 65 obtains the ratio between the calculated developing gap and the reference developing gap, and determines a fifth correction value with reference to the third correction table. The third correction value determiner 65 corrects the first correction value based on the fifth correction value. Because the third correction value determiner 65 corrects the first correction value based on the fifth correction value in accordance with a developing gap, a fog margin can be accurately determined.

Second Modification Example

While the corrector 59 includes the second correction value determiner 63 and the third correction value determiner 65 in addition to the first correction value determiner by way of example, the present invention is not limited to this. The corrector 59 may include only the first correction value determiner 61, and does not have to include the second correction value determiner 63 or the third correction value determiner 65. Further, the corrector 59 may include the first correction value determiner 61 and the second correction value determiner 63 and does not have to include the third correction value determiner 65. Further, the corrector 59 may include the first correction value determiner 61 and the third correction value determiner 65 and does not have to include the second correction value determiner 63.

Further, in a case in which there are other factors that affect a fog margin depending on a model, or in a case in which there are factors in regard to which it is statistically recognized based on the data collected from apparatuses that have been released to the market that it is necessary to correct a fog margin, a fog margin may be corrected based on these factors.

As described above, the MFP 100 in the present embodiment detects the density of a fog image formed on the photosensitive drum 23Y with a developing bias applied to the developing roller 221Y and with a charging bias applied to the charging roller 22Y for charging the photosensitive drum 23Y, and determines a temporary fog margin from among a plurality of differences based on the densities detected in a plurality of states where differences between a charging bias and a developing bias are different from one another and corrects the temporary fog margin based on a change rate δ(j) representing the ratio between a density detected in the state of a temporary fog margin and a density detected in the state of a fog margin smaller than the temporary fog margin. Therefore, an appropriate fog margin can be determined without improvement of performance of the detection sensor 29Y.

Further, the MFP 100 predicts the charge distribution of toner based on a fog developing characteristic, and determines a first correction value for correcting a temporary fog margin based on the predicted charge distribution of toner. Because a fog developing characteristic represents a difference in charge distribution of toner, a charging bias and a developing bias corresponding to the charge distribution of toner are determined. Therefore, it is possible to set a fog margin corresponding to the charge distribution of toner.

Further, the MFP 100 determines a second correction value based on the difference between a film thickness detected by the detection sensor 29Y for detecting the film thickness of the photosensitive drum 23Y and the reference film thickness defined with respect to the first correction value, and corrects the first correction value based on the second correction value. Therefore, it is possible to set a fog margin that is in accordance with the conversion of film thickness of the photosensitive drum 23Y.

Furthermore, in a case in which the developing roller 221Y and the photosensitive drum 23Y are replaced, the MFP 100 determines a third correction value based on the ratio between a fog developing characteristic detected after the replacement and a fog developing characteristic detected for the developing roller 221Y and the photosensitive drum 23Y defined as references for a first correction value, and corrects the first correction value based on the third correction value. Therefore, it is possible to determine a fog margin corresponding to the size of each of the developing roller 221Y and the photosensitive drum 23Y.

Further, in a case in which the photosensitive drum 23Y is replaced, the MFP 100 determines a fourth correction value based on the ratio of a fog developing characteristic obtained by correction of a fog developing characteristic detected before the replacement with a fog developing characteristic detected with respect to an image bearing member defined as a reference for a first correction value, and a fog developing characteristic detected after the replacement, and corrects the first correction value based on the fourth correction value. Therefore, it is possible to determine a fog margin corresponding to the size of the photosensitive drum 23Y.

Further, in a case in which the developing roller 221Y is replaced, the MFP 100 determines a fifth correction value based on the ratio of a fog developing characteristic obtained by correcting a fog developing characteristic detected after the replacement with a fog developing characteristic detected with respect to an image bearing member defined as a reference for the first correction value, and a fog developing characteristic detected after the replacement, and corrects the first correction value based on the fifth correction value. Therefore, it is possible to determine a fog margin corresponding to the size of the developing roller 221Y.

Overview of Embodiments (Item 1) An image forming apparatus includes a density detector that detects a density of a fog image formed on an image bearing member, a temporary determiner that determines a temporary fog margin which is a fog margin representing a difference between a developing bias to be applied to a toner bearing member and a charging bias to be applied to a charging device for charging the image bearing member based on a density detected by the density detector, and a corrector that corrects the temporary fog margin based on a change rate of a density detected by the density detector with respect to a change of a fog margin.

According to this aspect, a temporary fog margin is determined based on a density detected by the density detector, and a temporary fog margin is corrected based on the change rate at which the density detected by the density detector changes with respect to the change of fog margin. Therefore, it is possible to provide the image forming apparatus capable of determining an appropriate fog margin without improving performance of detection of a toner density.

(Item 2) The image forming apparatus according to item 1, wherein the corrector predicts a charge distribution of toner based on a change rate of a density detected by the density detector with respect to a change of a fog margin, and determines a first correction value for correction of the temporary fog margin based on the predicted charge distribution of toner.

According to this aspect, because the density change rate represents a difference in charge distribution of toner, a charging bias and a developing bias corresponding to the charge distribution of toner are determined. Therefore, it is possible to set a fog margin corresponding to the charge distribution of toner.

(Item 3) The image forming apparatus according to item 1, further includes a detector that detects a film thickness of the image bearing member, wherein the corrector determines a second correction value based on a difference between the detected film thickness and a reference film thickness defined with respect to the first correction value, and corrects the first correction value based on the second correction value.

According to this aspect, it is possible to set a fog margin corresponding to the conversion of film thickness of an image bearing member.

(Item 4) The image forming apparatus according to item 2 or 3, wherein the corrector, in a case in which the toner bearing member and the image bearing member are replaced, determines a third correction value based on a ratio between a change rate of a density detected after replacement and a change rate of a density detected for a toner bearing member and an image bearing member defined as references for the first correction value, and corrects the first correction value based on the third correction value.

According to this aspect, it is possible to determine a fog margin corresponding to the size of each of a toner bearing member and an image bearing member.

(Item 5) The image forming apparatus according to any one of items 2 to 4, wherein the corrector, in a case in which the image bearing member is replaced, determines a fourth correction value based on a ratio between a rate obtained by correction of a change rate of a density detected before replacement with a change rate of a density detected for an image bearing member defined as a reference for the first correction value, and a change rate of a density detected after replacement, and corrects the first correction value based on the fourth correction value.

According to this aspect, it is possible to determine a fog margin corresponding to the size of an image bearing member.

(Item 6) The image forming apparatus according to any one of items 2 to 4, wherein the corrector, in a case in which the toner bearing member is replaced, determines a fifth correction value based on a ratio between a rate obtained by correction of a change rate of a density detected after replacement with a change rate of a density detected for an image bearing member defined as a reference for the first correction value, and a change rate of a density detected after replacement, and corrects the first correction value based on the fifth correction value.

According to this aspect, it is possible to determine a fog margin corresponding to the size of a toner bearing member.

(Item 7) A fog margin determination method of causing an image forming apparatus to execute a density detecting step of detecting a density of a fog image formed on an image bearing member, a temporary determining step of determining a temporary fog margin which is a fog margin representing a difference between a developing bias to be applied to a toner bearing member and a charging bias to be applied to a charging device for charging the image bearing member based on a density detected in the density detecting step, and a correcting step of correcting the temporary fog margin based on a change rate of a density detected in the density detecting step with respect to a change of a fog margin.

According to this aspect, it is possible to provide a fog margin determination method with which it is possible to determine an appropriate fog margin without improving accuracy of detection of a toner density.

(Item 8) A non-transitory computer-readable recording medium encoded with a fog margin determination program for causing a computer executed in a computer, the fog margin determination program causing the computer to perform a density detecting step of detecting a density of a fog image formed on an image bearing member, a temporary determining step of determining a temporary fog margin which is a fog margin representing a difference between a developing bias to be applied to a toner bearing member and a charging bias to be applied to a charging device for charging the image bearing member based on a density detected in the density detecting step, and a correcting step of correcting the temporary fog margin based on a change rate of a density detected in the density detecting step with respect to a change of a fog margin.

According to this aspect, it is possible to provide a fog margin determining program with which it is possible to determine an appropriate fog margin without improving accuracy of detection of a toner density.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:

a density detector that detects a density of a fog image formed on an image bearing member;

a temporary determiner that determines a temporary fog margin which is a fog margin representing a difference between a developing bias to be applied to a toner bearing member and a charging bias to be applied to a charging device for charging the image bearing member based on a density detected by the density detector; and a corrector that corrects the temporary fog margin based on a change rate of a density detected by the density detector with respect to a change of a fog margin.

2. The image forming apparatus according to claim 1, wherein the corrector predicts a charge distribution of toner based on a change rate of a density detected by the density detector with respect to a change of a fog margin, and determines a first correction value for correction of the temporary fog margin based on the predicted charge distribution of toner.

3. The image forming apparatus according to claim 2, further comprising a detector that detects a film thickness of the image bearing member, wherein the corrector determines a second correction value based on a difference between the detected film thickness and a reference film thickness defined with respect to the first correction value, and corrects the first correction value based on the second correction value.

4. The image forming apparatus according to claim 2, wherein the corrector, in a case in which the toner bearing member and the image bearing member are replaced, determines a third correction value based on a ratio between a change rate of a density detected after replacement and a change rate of a density detected for a toner bearing member and an image bearing member defined as references for the first correction value, and corrects the first correction value based on the third correction value.

5. The image forming apparatus according to claim 2, wherein the corrector, in a case in which the image bearing member is replaced, determines a fourth correction value based on a ratio between a rate obtained by correction of a change rate of a density detected before replacement with a change rate of a density detected for an image bearing member defined as a reference for the first correction value, and a change rate of a density detected after replacement, and corrects the first correction value based on the fourth correction value.

6. The image forming apparatus according to claim 2, wherein the corrector, in a case in which the toner bearing member is replaced, determines a fifth correction value based on a ratio between a rate obtained by correction of a change rate of a density detected after replacement with a change rate of a density detected for an image bearing member defined as a reference for the first correction value, and a change rate of a density detected after replacement, and corrects the first correction value based on the fifth correction value.

7. A fog margin determination method of causing an image forming apparatus to execute:

a density detecting step of detecting a density of a fog image formed on an image bearing member;

a temporary determining step of determining a temporary fog margin which is a fog margin representing a difference between a developing bias to be applied to a toner bearing member and a charging bias to be applied to a charging device for charging the image bearing member based on a density detected in the density detecting step; and a correcting step of correcting the temporary fog margin based on a change rate of a density detected in the density detecting step with respect to a change of a fog margin.

8. The fog margin determination method according to claim 7, wherein the correcting step includes predicting a charge distribution of toner based on a change rate of a density detected by the density detector with respect to a change of a fog margin, and determining a first correction value for correction of the temporary fog margin based on the predicted charge distribution of toner.

9. The fog margin determination method according to claim 8, wherein the correcting step includes determining a second correction value based on a difference between the detected film thickness and a reference film thickness defined with respect to the first correction value, and correcting the first correction value based on the second correction value.

10. The fog margin determination method according to claim 8, wherein the correcting step includes, in a case in which the toner bearing member and the image bearing member are replaced, determining a third correction value based on a ratio between a change rate of a density detected after replacement and a change rate of a density detected for a toner bearing member and an image bearing member defined as references for the first correction value, and correcting the first correction value based on the third correction value.

11. The fog margin determination method according to claim 8, wherein the correcting step includes, in a case in which the image bearing member is replaced, determining a fourth correction value based on a ratio between a rate obtained by correction of a change rate of a density detected before replacement with a change rate of a density detected for an image bearing member defined as a reference for the first correction value, and a change rate of a density detected after replacement, and correcting the first correction value based on the fourth correction value.

12. The fog margin determination method according to claim 8, wherein the correcting step includes, in a case in which the toner bearing member is replaced, determining a fifth correction value based on a ratio between a rate obtained by correction of a change rate of a density detected after replacement with a change rate of a density detected for an image bearing member defined as a reference for the first correction value, and a change rate of a density detected after replacement, and correcting the first correction value based on the fifth correction value.

13. A non-transitory computer-readable recording medium encoded with a fog margin determination program executed in a computer, the fog margin determination program causing the computer to perform:

a density detecting step of detecting a density of a fog image formed on an image bearing member;

a temporary determining step of determining a temporary fog margin which is a fog margin representing a difference between a developing bias to be applied to a toner bearing member and a charging bias to be applied to a charging device for charging the image bearing member based on a density detected in the density detecting step; and a correcting step of correcting the temporary fog margin based on a change rate of a density detected in the density detecting step with respect to a change of a fog margin.

14. The non-transitory computer-readable recording medium encoded with a fog margin determination program according to claim 13, wherein the correcting step includes predicting a charge distribution of toner based on a change rate of a density detected by the density detector with respect to a change of a fog margin, and determining a first correction value for correction of the temporary fog margin based on the predicted charge distribution of toner.

15. The non-transitory computer-readable recording medium encoded with a fog margin determination program according to claim 14, wherein the correcting step includes determining a second correction value based on a difference between the detected film thickness and a reference film thickness defined with respect to the first correction value, and correcting the first correction value based on the second correction value.

16. The non-transitory computer-readable recording medium encoded with a fog margin determination program according to claim 14, wherein the correcting step includes, in a case in which the toner bearing member and the image bearing member are replaced, determining a third correction value based on a ratio between a change rate of a density detected after replacement and a change rate of a density detected for a toner bearing member and an image bearing member defined as references for the first correction value, and correcting the first correction value based on the third correction value.

17. The non-transitory computer-readable recording medium encoded with a fog margin determination program according to claim 14, wherein the correcting step includes, in a case in which the image bearing member is replaced, determining a fourth correction value based on a ratio between a rate obtained by correction of a change rate of a density detected before replacement with a change rate of a density detected for an image bearing member defined as a reference for the first correction value, and a change rate of a density detected after replacement, and correcting the first correction value based on the fourth correction value.

18. The non-transitory computer-readable recording medium encoded with a fog margin determination program according to claim 14, wherein the correcting step includes, in a case in which the toner bearing member is replaced, determining a fifth correction value based on a ratio between a rate obtained by correction of a change rate of a density detected after replacement with a change rate of a density detected for an image bearing member defined as a reference for the first correction value, and a change rate of a density detected after replacement, and correcting the first correction value based on the fifth correction value.

* * * * *